Nov. 7, 1950  A. E. SCHROEDER  2,529,354
CAKE MOLD
Filed Feb. 17, 1948

Alice E. Schroeder
INVENTOR.

BY
Attorneys

Patented Nov. 7, 1950

2,529,354

UNITED STATES PATENT OFFICE 2,529,354

CAKE MOLD

Alice E. Schroeder, Los Angeles, Calif.

Application February 17, 1948, Serial No. 8,909

2 Claims. (Cl. 220—22)

This invention relates to new and useful improvements in molds and the primary object of the present invention is to provide a cake mold so that a cake formed therein will have concentric rings of various colored or contrastingly colored dough masses.

Another important object of the present invention is to provide a cake mold that is conveniently inserted into a baking pan for dividing the baking pan into a plurality of annular compartments that receive dough masses of various flavors and/or colors.

A further object of the present invention is to provide a cake mold that is extremely small and compact in structure and which may be quickly and readily removed from a baking pan after the cake batter has been placed therein prior to the baking of the cake batter.

A still further aim of the present invention is to provide a cake mold that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
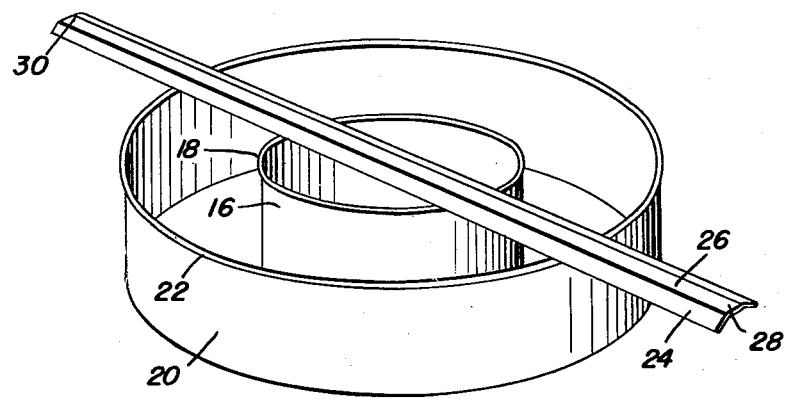
Figure 1 is a perspective view of the present cake mold removed from a baking pan.
Figure 2:
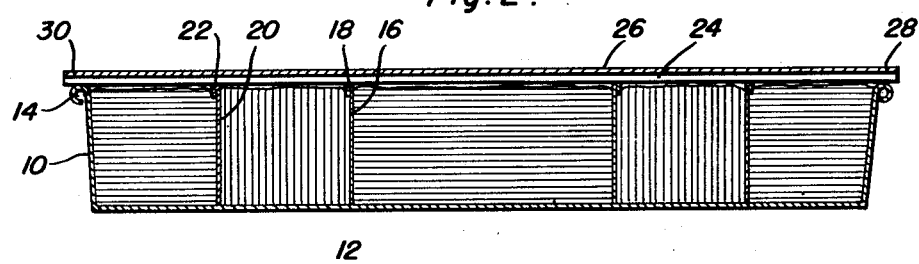
Figure 2 is a diametrical vertical sectional view taken substantially through the center of a baking pan in which the present mold and cake batter is disposed; and, Figure 3 is a diagrammatical elevational view of a three layer cake which is formed by the present invention.

Referring now to the drawings in detail, wherein for the purpose of illustration, there is disclosed a preferred embodiment of the present invention, the numeral 10 represents the annular wall of a baking pan 12 the upper edge of which is rolled outwardly to provide an annular beading 14.

Positioned within the baking pan 12, is an annular inner wall or partition 16 having a rolled upper edge 18, and an intermediate annular wall or partition 20 which is also formed with a rolled upper edge 22.

Rigidly secured to the upper edges 18 and 22 of the inner partition 16 and the intermediate partition 20, are the outwardly diverging longitudinal edges 24 of an elongated handle 26 that retains the partitions 16 and 20 spaced relative to each other. The terminals 28 and 30 of handle 26 project outwardly from the outer periphery of the intermediate partition 20 and rest upon the upper edge or beading 14 of baking pan 12 to gauge the positioning of the partitions 16 and 20 in the baking pan 12, so that the intermediate partition 20 will be spaced centrally within the baking pan with the outer periphery of the intermediate partition spaced relative to the inner periphery of the annular wall 10 for the baking pan 12.

In practical use of the present invention, differently colored and/or flavored dough masses or cake batter is inserted between the intermediate partition 20 and the annular wall 10 of the baking pan 12, the intermediate partition 20 and the inner partition 16, and within the inner partition so that when the cake baked is cut the same will have an attractive cross sectional appearance.

Figure 3:
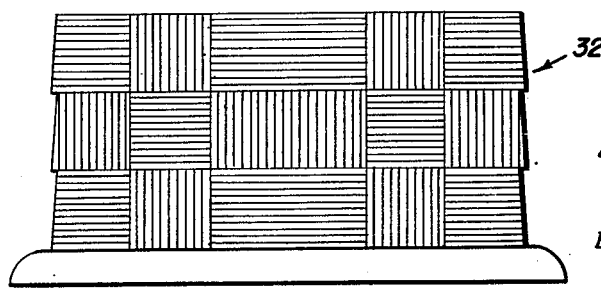

Obviously, a suitable number of layers may be employed and by varying the dough masses disposed between the partitions, a selected configurational change of the cross sectional appearance of the cake 32 may be effected, so that the same will add appreciable qualities in forming a pleasing article for the patrons or the like of bakeries and other food serving agencies, as shown best in Figure 3 of the drawings.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. In combination with a baking pan having an annular wall and a circular bottom wall, an inner annular partition supported upon the bottom wall of said baking pan, an annular intermediate partition disposed on the bottom wall of said baking pan, said annular wall and said partitions being concentric, and an elongated member disposed diametrically of and secured to said partitions and having end portions supported upon the annular wall of said baking pan, said member constituting the sole means for joining said partitions.

2. In combination with a baking pan having an annular wall and a circular bottom wall, of an insert for the pan, said insert comprising a pair of inner and outer, concentric, circular partitions having upper rolled edges, and an elongated handle disposed diametrically of said partitions and secured to the upper rolled edges of the partitions, said annular wall having an upper edge, the ends of said handle being supported upon the upper edge of said annular wall, said annular wall being concentrically disposed with respect to said partitions, the central portion of said handle overlying the central portion of said inner partition.

ALICE E. SCHROEDER.

REFERENCES CITED

The following references are of record in the file of this patent:

UNITED STATES PATENTS

| Number | Name | Date |
| --- | --- | --- |
| 1,624,941 | Fulkerson | Apr. 9, 1927 |
| 2,157,896 | Held | May 9, 1939 |